US011280765B2

(12) United States Patent
Werner et al.

(10) Patent No.: US 11,280,765 B2
(45) Date of Patent: Mar. 22, 2022

(54) METHODS AND DEVICES FOR ULTRASONIC NONDESTRUCTIVE TESTING DEVICES

(71) Applicant: Baker Hughes Oilfield Operations LLC, Houston, TX (US)

(72) Inventors: Daniel Werner, Hurth (DE); Andreas Franzen, Hurth (DE); Frank Henrix, Hurth (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 46 days.

(21) Appl. No.: 16/836,438

(22) Filed: Mar. 31, 2020

(65) Prior Publication Data

US 2021/0302392 A1 Sep. 30, 2021

(51) Int. Cl.
*G01N 29/44* (2006.01)
*G01N 29/27* (2006.01)
*G01N 29/04* (2006.01)

(52) U.S. Cl.
CPC ....... *G01N 29/4463* (2013.01); *G01N 29/043* (2013.01); *G01N 29/27* (2013.01); *G01N 2291/2696* (2013.01)

(58) Field of Classification Search
CPC .. G01N 29/4463; G01N 29/043; G01N 29/27; G01N 2291/2696
USPC .......................................................... 73/602
See application file for complete search history.

(56) References Cited

U.S. PATENT DOCUMENTS

| 2006/0243051 A1 | 11/2006 | Bui et al. |
| 2008/0307887 A1 | 12/2008 | Sarr |
| 2014/0224024 A1 * | 8/2014 | Murakoshi ......... G01N 29/0645 73/632 |
| 2018/0017532 A1 | 1/2018 | Falter et al. |

FOREIGN PATENT DOCUMENTS

| KR | 10-2011-0065866 A | 6/2011 | |
| WO | 2019-075347 A1 | 4/2019 | |
| WO | WO-2019075347 A1 * | 4/2019 | ............. G01N 29/11 |

OTHER PUBLICATIONS

International Search Report and Written Opinion issued in corresponding International Application No. PCT/US2021/023459, dated Jun. 21, 2021, 10 pages.

\* cited by examiner

*Primary Examiner* — Tarun Sinha
(74) *Attorney, Agent, or Firm* — Mintz Levin Cohn Ferris Glovsky and Popeo, PC; Lisa Adams

(57) ABSTRACT

A non-destructive testing system includes a probe positioning assembly, a matrix array ultrasonic probe arranged on the probe positioning assembly configured to position the matrix array ultrasonic probe adjacent to a mating axial surface of a wheel for ultrasonic communication with the wheel. The matrix array ultrasonic probe is configured to emit a validation ultrasonic signal directed towards a coupling validation section within the wheel, measure the emitted validation ultrasonic signal after reflection from the coupling validation section, emit a plurality of ultrasonic inspection signals directed towards at least one inspection section of the wheel, and measure each of the plurality of ultrasonic inspection signals reflected from a defect positioned within the inspection section of the wheel.

18 Claims, 5 Drawing Sheets

METHODS AND DEVICES FOR ULTRASONIC NONDESTRUCTIVE TESTING DEVICES

BACKGROUND

Non-destructive testing (NDT) is a class of analytical techniques that can be used to inspect a target, without causing damage, to ensure that the inspected target meets required specifications. For this reason, NDT has found wide acceptance in industries such as aerospace, power generation, oil and gas transport or refining, and transportation, which employ structures that are not easily removed from their surroundings. Certain inspection techniques, such as non-destructive inspection techniques or non-destructive testing (NDT) techniques, can be used to detect undesired equipment conditions.

As an example, global railroad standards can require train wheels to be ultrasonically inspected after manufacture and during maintenance on a regular basis. In ultrasonic testing, acoustic (sound) energy in the form, of waves can be directed towards the train wheel. As the ultrasonic waves contact and penetrate the train wheel, they can reflect from features such as outer surfaces and interior defects (e.g., cracks, porosity, etc.). An ultrasonic sensor can acquire ultrasonic measurements of acoustic strength as a function of time. Subsequently, these ultrasonic measurements can be analyzed to provide testing results that characterize defects present within a train wheel, such as their presence or absence, location, and/or size.

SUMMARY

Certain NDT devices can be used to observe structure of solid objects, such as train wheels. Ultrasonic NDT devices can be arranged adjacent to through these solid objects to perform maintenance checks to determine corrosion or internal defects. Such ultrasonic NDT devices require the ability to be validate a probe's location with respect to a solid object, and to determine surface and internal defects in multiple inspection section of the solid object. Therefore, it is beneficial to increase the functionality of an ultrasonic NDT device to both validate and measure using ultrasonic waves.

In general, systems and methods are provided for ultrasonic non-destructive testing devices.

In one embodiment, non-destructive testing system can include a probe positioning assembly and a matrix array ultrasonic probe arranged on the probe positioning assembly configured to position the matrix array ultrasonic probe adjacent to a mating axial surface of a wheel for ultrasonic communication with the wheel. The matrix array ultrasonic probe is configured to emit a validation ultrasonic signal directed towards a coupling validation section within the wheel, measure the emitted validation ultrasonic signal after reflection from the coupling validation section, emit a plurality of ultrasonic inspection signals directed towards at least one inspection section of the wheel, and measure each of the plurality of ultrasonic inspection signals reflected from a defect positioned within the inspection section of the wheel.

In another embodiment, the inspection section can further comprise a first inspection section and a second inspection section.

In another embodiment, the first inspection section can be an outer surface of the wheel and the second inspection section can be a flange of the wheel.

In another embodiment, the coupling validation section can be an outer axial surface opposite the mating axial surface of the wheel.

In another embodiment, the validation ultrasonic signal can be a back-wall echo of a single ultrasonic inspection signal from the plurality of ultrasonic inspection signals directed at the outer axial surface.

In another embodiment, an ultrasonic complaint fluid can be arranged between the matrix array ultrasonic probe and the mating axial surface of the wheel.

In another embodiment, the non-destructive testing system can further comprise a control unit comprising: at least one data processor; and a memory storing instructions, which when executed by the at least one data processor causes the at least one data processor to perform operations comprising: receiving the measured validation ultrasonic signal and the plurality of measured inspection ultrasonic signals; determining a correction ratio between the measured validation ultrasonic signal and a reference validation signal; and computing a plurality of corrected measured inspection ultrasonic signals based on the correction ratio.

In another embodiment, the matrix array ultrasonic probe emitting the plurality of inspection ultrasonic signals can be configured to sweep the plurality of inspection ultrasonic signals through an arc of predetermined directions.

In another embodiment, the matrix array ultrasonic probe measuring the plurality of reflected inspection ultrasonic beams can be configured to measure a plurality of inspection ultrasonic signals after reflection from a plurality of respective defects.

In another embodiment, the probe positioning assembly can be configured to reversibly lift the wheel above an underlying surface and to rotate the wheel while lifted.

Methods for controlling a non-destructive testing device are also provided. In one embodiment, a method can include positioning a matrix array ultrasonic probe adjacent to a mating axial surface of a wheel for ultrasonic communication with the wheel, the wheel including a coupling validation section and an inspection section; emitting, via the matrix array ultrasonic probe, a validation ultrasonic signal directed towards the coupling validation section of the wheel; measuring, via the matrix array ultrasonic probe, the emitted validation ultrasonic signal after reflection from the coupling validation section; emitting, via the matrix array ultrasonic probe, a plurality of ultrasonic inspection signals toward the inspection area of the wheel; measuring, via the matrix array ultrasonic probe, each of the plurality of the inspection ultrasonic signals after reflection from a defect positioned within the inspection area; and receiving, via a control unit in communication with the matrix array ultrasonic probe, the measured validation ultrasonic signal and the plurality of measured inspection ultrasonic signals, wherein the control unit comprises at least one data processor and a memory storing instructions.

In another embodiment, the method further comprises determining, via the control unit, a correction ratio between the measured validation ultrasonic signal and a reference validation signal, and computing, via the control unit, a plurality of corrected measured inspection ultrasonic signals based on the correction ratio.

In another embodiment, the inspection section can further comprise a first inspection section and a second inspection section.

In another embodiment, the first inspection section can be an outer surface of the wheel and the second inspection section can be a flange of the wheel.

In another embodiment, the coupling validation section can be an outer axial surface opposite the mating axial surface of the wheel.

In another embodiment, the validation ultrasonic signal can be a back-wall echo of a single ultrasonic inspection signal from the plurality of ultrasonic inspection signals directed at the outer axial surface.

In another embodiment, an ultrasonic complaint fluid can be arranged between the matrix array ultrasonic probe and the mating axial surface of the wheel.

In another embodiment, the matrix array ultrasonic probe emitting the plurality of inspection ultrasonic signals can be configured to sweep the plurality of inspection ultrasonic signals through an arc of predetermined directions.

In another embodiment, the matrix array ultrasonic probe measuring the plurality of reflected inspection ultrasonic beams can be configured to measure a plurality of inspection ultrasonic signals after reflection from a plurality of respective defects.

In another embodiment, the probe positioning assembly can be configured to reversibly lift the wheel above an underlying surface and to rotate the wheel while lifted.

BRIEF DESCRIPTION OF THE DRAWINGS

A brief description of each drawing is provided to more sufficiently understand drawings used in the detailed description of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Wheels, for example train wheels, can develop damage, such as cracks, over time during use. If this damage becomes too severe, it can cause the wheel to break. To avoid failure of wheels during service, they can be inspected periodically. In some cases, because damage is not visible on the surface of the wheel, inspection can include techniques that allow the interior of the wheel to be investigated, such as ultrasonic testing. In ultrasonic testing, ultrasonic probes can be positioned on the wheel and they can send and receive ultrasonic waves (high frequency sound waves) to detect defects beneath the surface of the wheel.

When ultrasonic testing is performed correctly, ultrasonic waves can easily travel between the ultrasonic probes and the wheel. This condition, referred to as coupling, and can ensure that defects are accurately measured. Existing ultrasonic testing systems can use one or more first ultrasonic probes to measure defects and one or more second ultrasonic probes, different from the first ultrasonic probes, to make measurements that validate the ultrasonic coupling of the first ultrasonic probes. However, this technique assumes that coupling validation measurements acquired by the second probe(s) are applicable to the first ultrasonic probe(s). However, in some cases, this assumption can be false, and the defect measurements acquired by the first set of ultrasonic probes can be erroneous due to poor coupling.

Accordingly, improved ultrasonic testing systems and corresponding methods are provided in which each ultrasonic probe is configured to measure defects within a target, such as a wheel, and to validate its coupling to the wheel. Because an ultrasonic probe can independently validate its coupling to the wheel, as long as its coupling remains validated, its defect measurements are ensured to be accurate.

Embodiments of ultrasonic testing systems and corresponding methods for validating ultrasonic measurements acquired for train wheels are discussed herein. However, embodiments of the disclosure can be employed for ultrasonic testing of other target objects without limit.

Figure 1A:
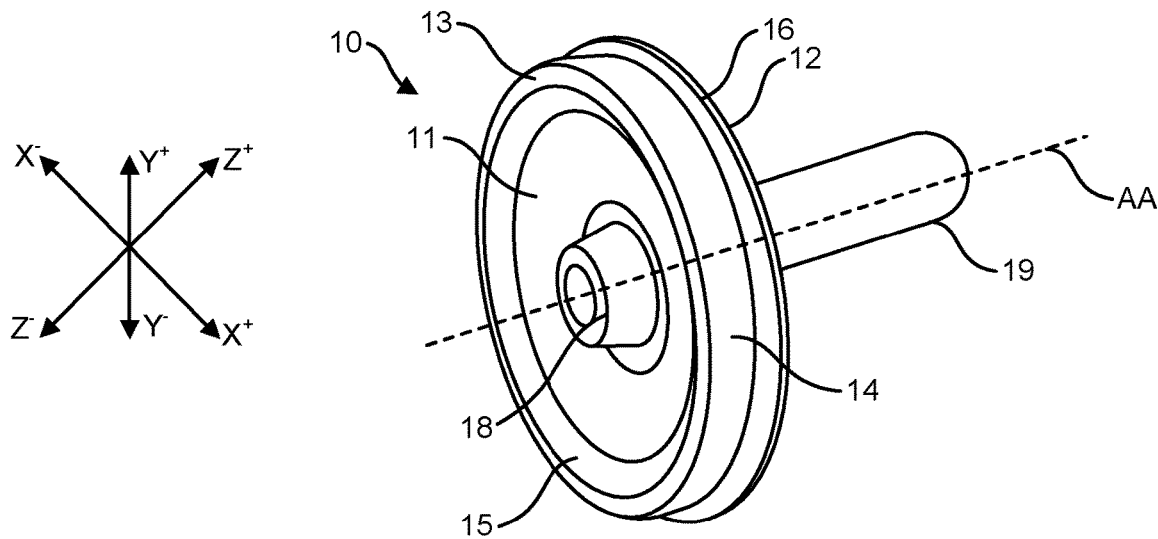
FIG. 1A is a perspective schematic illustration of a train wheel.
Figure 1B:
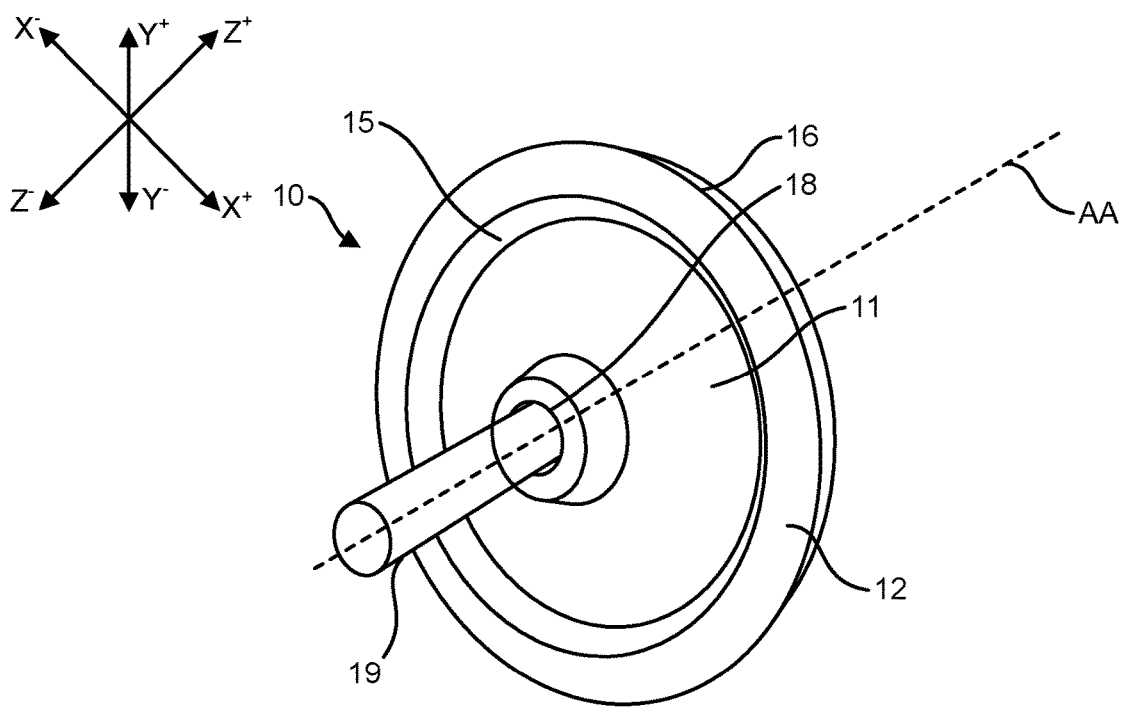
FIG. 1B is a perspective schematic illustration of the train wheel of FIG. 1A.

Referring now to FIGS. 1A and 1B, a schematic illustration of a train wheel 10 is generally depicted. The train wheel 10 can include a wheel disk 11, an inner axial surface 12, an outer axial surface 13, a running tread 14, a body 15, and a wheel flange 16. The wheel disk 11 can form a center of the train wheel 10 and the running tread 14 can form a circumferential outer surface of the train wheel 10. The wheel flange 16 can be formed on one side of the train wheel 10 (e.g., an interior side) and extend radially outward from the running tread 14.

The wheel disk 11 can include one or more holes arranged therein. As depicted, a primary hole 18 can be positioned at a center of the wheel disk 11 and be configured for receipt of an axle 19, wherein the axle is concentric with an axial axis AA. One or more secondary holes can be formed radially outward from the primary hole 18 and configured for coupling other components to the train wheel 10, such as brake disks (not shown).

Figure 2A:
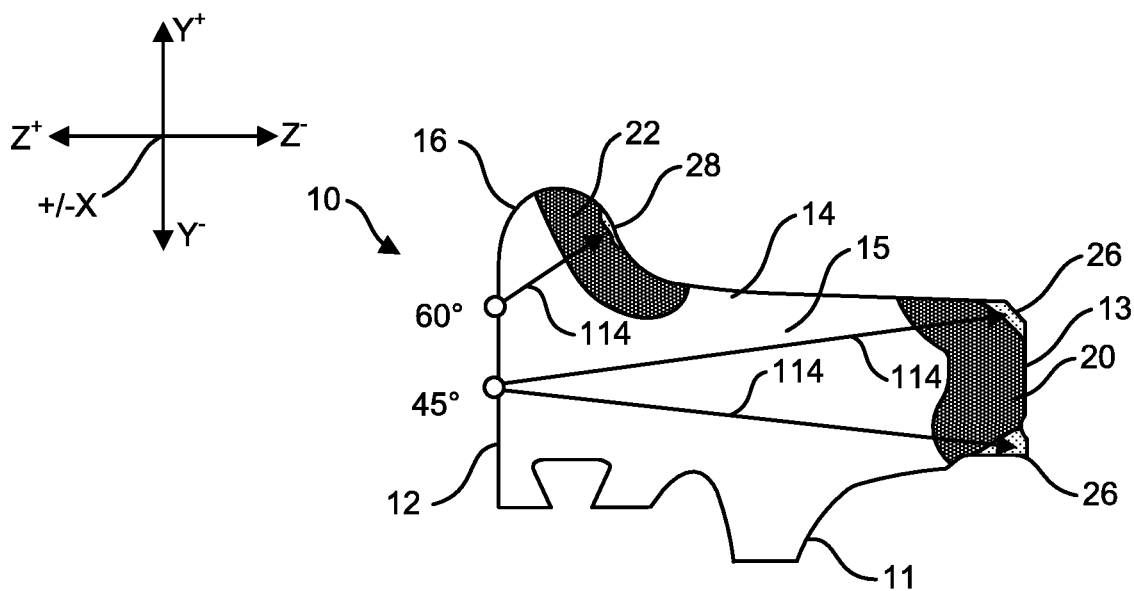
FIG. 2A is a cross-sectional schematic illustration of the train wheel of FIG. 1A.
Figure 2B:
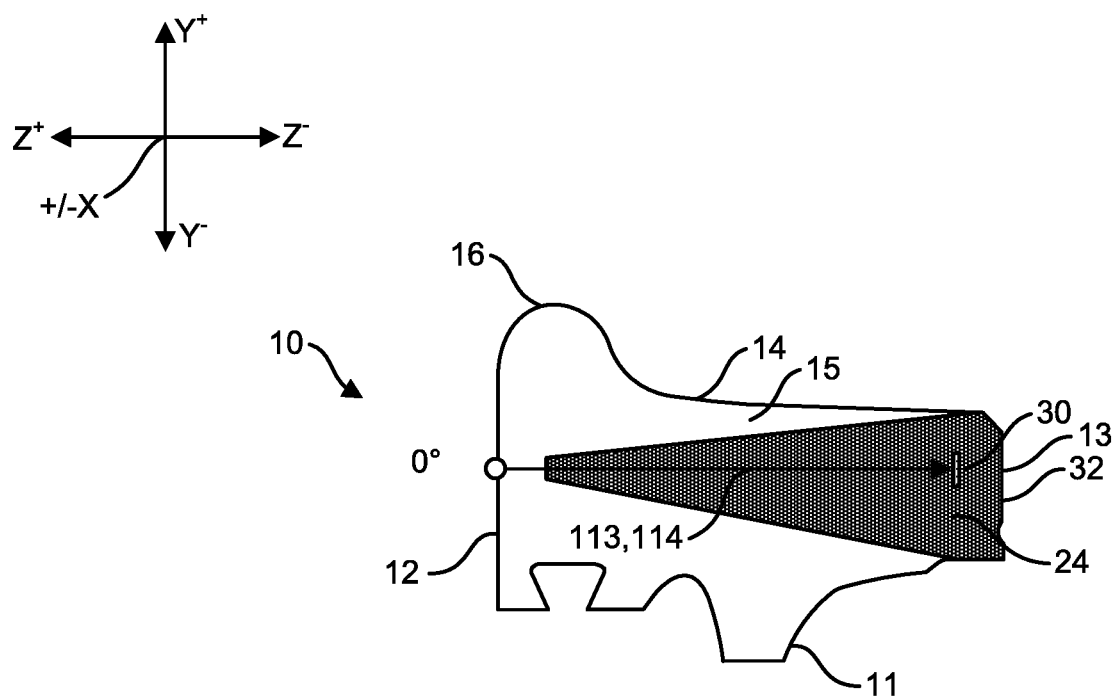
FIG. 2B is a cross-sectional schematic illustration of the train wheel of FIG. 1A.

Referring now to FIGS. 2A and 2B, a cross-sectional schematic view of the train wheel 10 is depicted. In an exemplary implementation, the train wheel 10 can include inspection sections 20, 22, and 24. The inspection section 20 can be arranged on the outer axial surface 13 to detect surface defects 26 forming on the outer axial surface 13. The inspection section 22 can be arranged on the wheel flange 16 to detect defects 28 forming on the wheel flange 16. The inspection section 24 can be arranged within the body 15 to detect internal defects 30 within the body 15 of the train wheel 10. The inspection sections 20 and 22 can extend inward from the outer surfaces to the body 15 of the train wheel 10. As depicted, as an ultrasonic probe is arranged on the inner axial surface 12 and mated to the train wheel 10, the inspection sections 20, 22, and 24 are at varying angles with respect to the inner axial surface 12.

In general, when ultrasonic beams pass through a material, they can reflect from surfaces of the material, such as interior defects (e.g., cracks, pores, etc.) and outer surfaces. Material features, such as geometric boundaries and defects, can reflect ultrasonic beams in different ways. Some material features can reflect ultrasonic beams better than others, and the strength of the reflected ultrasonic beams can vary. Material features can also be at different distances from the ultrasonic probes and the time at which reflected ultrasonic beams reach the ultrasonic probes can vary. Measurements of the strength and time behavior of ultrasonic beams reflected from the train wheel 10 can be analyzed to determine the position and size of surface defects within the inspection sections 20 and 22, and internal defects within the inspection section 24.

Figure 3A:
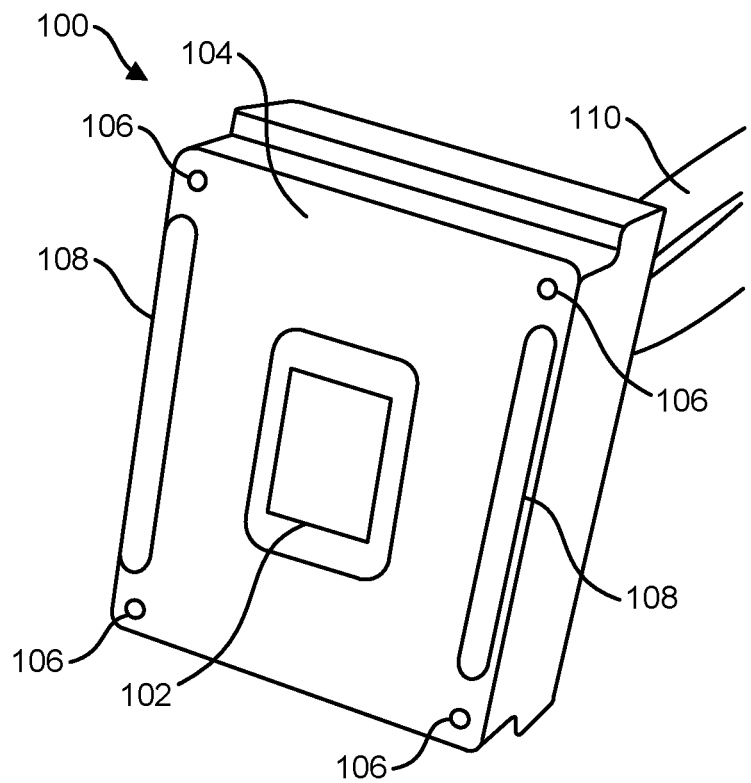
FIG. 3A is a perspective schematic illustration of one exemplary embodiment of an ultrasonic non-destructive testing (NDT) device.
Figure 3B:
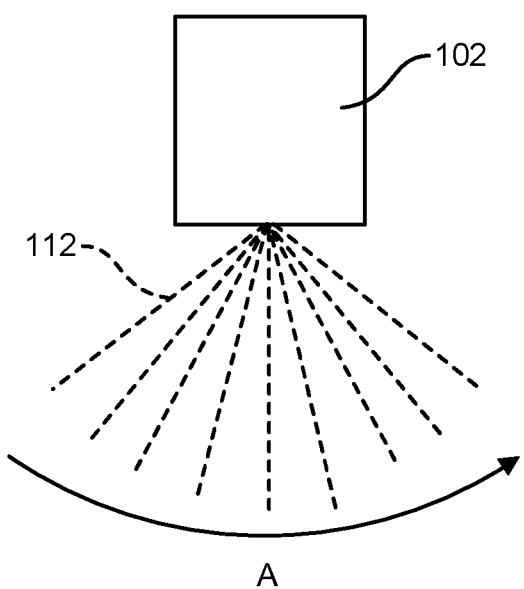
FIG. 3B is a schematic illustration of one exemplary embodiment of a matrix array ultrasonic probe.

Referring now to FIGS. 3A and 3B, an ultrasonic probe assembly 100 can include a matrix array ultrasonic probe 102, a housing 104, apertures 106, and spacers 108. In an exemplary embodiment, the matrix array ultrasonic probe 102 is arranged within the housing 104 so that the matrix array ultrasonic probe 102 is arranged facing outward in order to mate with the inner axial surface 12 of the train wheel 10. The apertures 106 can also be arranged on the housing 104 in order to provide an ultrasonic compliant fluid (i.e., water) to the matrix array ultrasonic probe 102 so that ultrasonic waves can pass through the fluid to the train wheel 10 when an ultrasonic measurement is being taken. In an exemplary implementation, the spacers 108 can be arranged in order to provide a small gap between the inner axial surface 12 and the matrix array ultrasonic probe 102 in order to protect the surface of the matrix array ultrasonic probe 102. The spacers 108 can be made from ceramic particles. The matrix array ultrasonic probe 102 can be communicatively coupled to the control unit via the cable 110.

Referring still to FIGS. 3A and 3B, a matrix array ultrasonic probe 102, also referred to as phased array ultrasonic probes, can include two or more ultrasonic active elements. These ultrasonic active elements can be configured to generate and measure ultrasonic beams and can be arranged in a predetermined pattern with respect to one another (e.g., a line, a circle, a grid, etc.). Each of the ultrasonic active elements can also be configured to generate ultrasonic beams that are varied in strength and/or time with respect to ultrasonic beams generated by the other ultrasonic active elements. The various ultrasonic beams can interfere with each other to produce a net ultrasonic beam 112 in a predetermined direction. This process can be repeated as necessary to sweep the ultrasonic beam 112 through an arc A of different predetermined directions.

Figure 4:
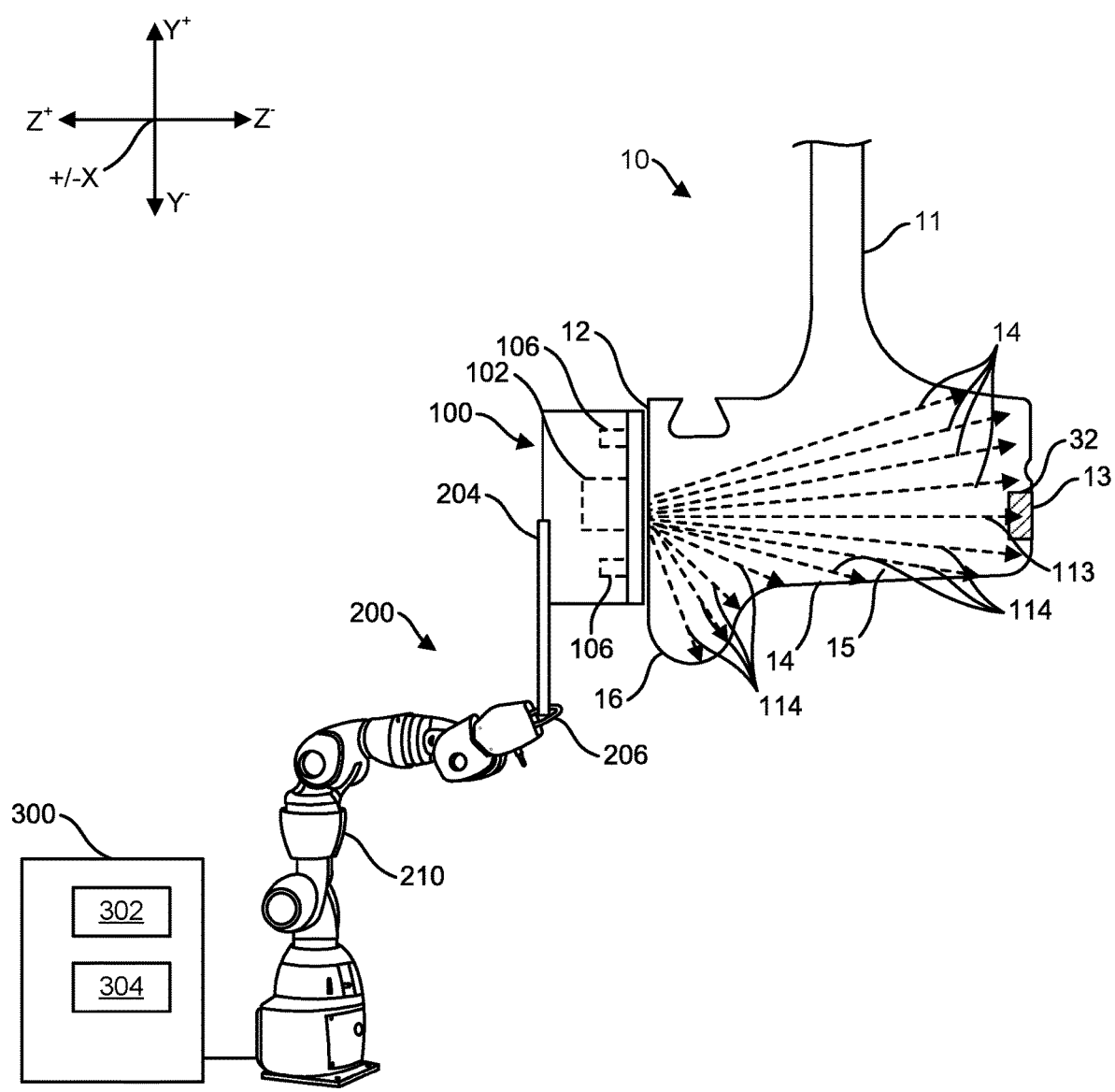
FIG. 4 is a cross-sectional schematic illustration of the NDT device of FIG. 3A.

Referring now to FIG. 4, the ultrasonic NDT device assembly 200 can include the ultrasonic probe assembly 100 of FIG. 3A, a probe holder 204, a probe holder mount 206, a positioning unit 210, and a control unit 300. As shown, matrix array ultrasonic probe 102 can be positioned on or adjacent to the train wheel 10 (e.g., an inner axial surface 12 of the body 15) for ultrasonic testing. A single matrix array ultrasonic probe 102 is illustrated. However, any number of matrix array probes can be employed in various positions about the train wheel 10 without limit. Under circumstances where the system is employed with wheels other than train wheels 10, the matrix array ultrasonic probe 102 can be positioned on or adjacent to the wheel at a suitable location, such as an outer axial surface of the wheel.

Still referring to FIG. 4, the matrix array ultrasonic probe 102 can be mechanically coupled to the probe holder 204 and oriented with respect to the train wheel 10. The probe holder 204 in turn can be coupled to the probe holder mount 206. The probe holder mount 206 can be secured to a positioning unit 210, which can position the matrix array ultrasonic probe 102 on or adjacent to the train wheel 10. The probe holder mount 206 can be coupled to the probe holder 204 and it can be configured to position the matrix array ultrasonic probe 102 adjacent to or in contact with the inner axial surface 12 for ultrasonic communication with the inspection sections 20, 22, and 24 of the train wheel 10. While the matrix array ultrasonic probe 102 is positioned adjacent to the train wheel 10, an ultrasonic compliant fluid (i.e., water) can be provided between the matrix array ultrasonic probe 102 and the train wheel 10 via the apertures 106 (shown in FIG. 3A) to facilitate ultrasonic communication.

In an exemplary implementation, the matrix array ultrasonic probe 102 can be configured to acquire measurements for detection of defects 26, 28, and 30 within inspection sections 20, 22, and 24. Additionally, validation of the ultrasonic coupling with respect to the train wheel 10 can be determined through a back-wall echo of an ultrasonic beam 112 contacting the outer axial surface 13. A validation ultrasonic signal 113 can be emitted from the matrix array ultrasonic probe 102 at a 0° angle in order to contact the outer axial surface 13 to verify the coupling between the matrix array ultrasonic probe 102 and the train wheel 10. A plurality of inspection ultrasonic signals 114 can also be emitted from the matrix array ultrasonic probe 102 in a sweeping arc A (shown in FIG. 3B). In an exemplary implementation, the validation ultrasonic signal 113 can be an ultrasonic beam 112 emitted prior to the plurality of inspection ultrasonic signals 114. In another exemplary implementation, the validation ultrasonic signal 113 can be one of the plurality of inspection ultrasonic signals 114, emitted during the sweeping arc A of the train wheel 10. The ultrasonic beams 112, validation ultrasonic signal 113, and plurality of inspection ultrasonic signals 114 can be emitted at a 2 kHz frequency.

In some exemplary embodiments, when using the ultrasonic NDT device assembly 200 for inspection of train wheel 10, a lift and rotation unit (not shown) can be configured to lift the train wheel 10 in the vertical direction (+Y) above an underlying rail (not shown). The lifted train wheel can then be examined by the ultrasonic NDT device assembly 200 at varying circumferential locations on the train wheel 10. After a measurement is completed, the train wheel 10 can be rotated about the axle 19 to an adjacent circumferential location.

Still referring to FIG. 4, the train wheel 10 can be lifted from an underlying surface (e.g., a rail) while the validation ultrasonic signal 113 and the plurality of inspection ultrasonic signals 114 are emitted and reflected within the train wheel 10. The train wheel 10 can also be rotated while lifted to facilitate inspection of substantially the entire volume of the train wheel 10. In one aspect, rotation can be performed after measurement of reflected inspection ultrasonic signals 114 and the validation ultrasonic signal 113. In some exemplary embodiments, the train wheel 10 is rotated 370° at 0.5 mm circumferential lengths. In another aspect, rotation can be performed at a selected speed during emission of the plurality of inspection ultrasonic signals 114 and the validation ultrasonic signal 113, reflection of reflected inspection ultrasonic signals 114 and the validation ultrasonic signal 113, and/or measurement of reflected inspection ultrasonic signals 114 and the validation ultrasonic signal 113.

Still referring to FIG. 4, the control unit 300 of the can be configured for electronic communication with the matrix array ultrasonic probe 102 and positioning unit 210. The control unit 300 can include any computing device employing a general purpose or application specific processor (e.g., processor 302) and can also include a memory 304. The processor 302 can include one or more processing devices, and the memory 304 can include one or more tangible, non-transitory, machine-readable media collectively storing instructions executable by the processor 302 to perform the methods and control actions described herein.

In one exemplary implementation, the memory 304 can store a reference validation signal for each coupling validation section 32. The reference validation signal can represent a validation ultrasonic signal 113 measured under conditions of good coupling. The memory 304 can further store instructions and/or algorithms for determining whether the measured validation ultrasonic signal 113 reflected from a coupling validation section 32 matches a corresponding reference ultrasonic signal for that coupling validation section 32. As an example, a match can be determined when the strength of the measured validation ultrasonic signal 113 and the reference validation ultrasonic signal vary from one another by less than a predetermined threshold amount as a function of time. Conversely, a match may not be determined when the strength of the measured validation ultrasonic signal 113 and the reference validation ultrasonic signal vary from one another by greater than the predetermined threshold amount as a function of time.

In an exemplary implementation, the memory 304 can store a reference validation signal strength for each coupling validation section 32. The reference validation signal strength can represent a threshold strength above which a validation ultrasonic signal 113 can be considered to represent good coupling between the matrix array ultrasonic probe 102 and the train wheel 10. The memory 304 can further store instructions and/or algorithms for determining whether the measured validation ultrasonic signal 113 reflected from a coupling validation section 32 exhibits a strength greater than or equal to the reference validation signal strength for that coupling validation section 32. A measured validation ultrasonic signal 113 having a strength greater than or equal to the reference validation signal strength can be considered to possess good coupling. Conversely, a measured validation ultrasonic signal 113 determined having a strength less than the reference validation signal strength can be considered to possess poor coupling. Additionally, a measured validation ultrasonic signal 113 can be compared to the reference validation signal strength in order to determine a ratio which is representative of the coupling. Once the ratio is determined, each of the plurality of inspection ultrasonic signals 114 can be corrected using a stored algorithm within the memory 304 to determine if defects exist within the train wheel 10.

Figure 5:
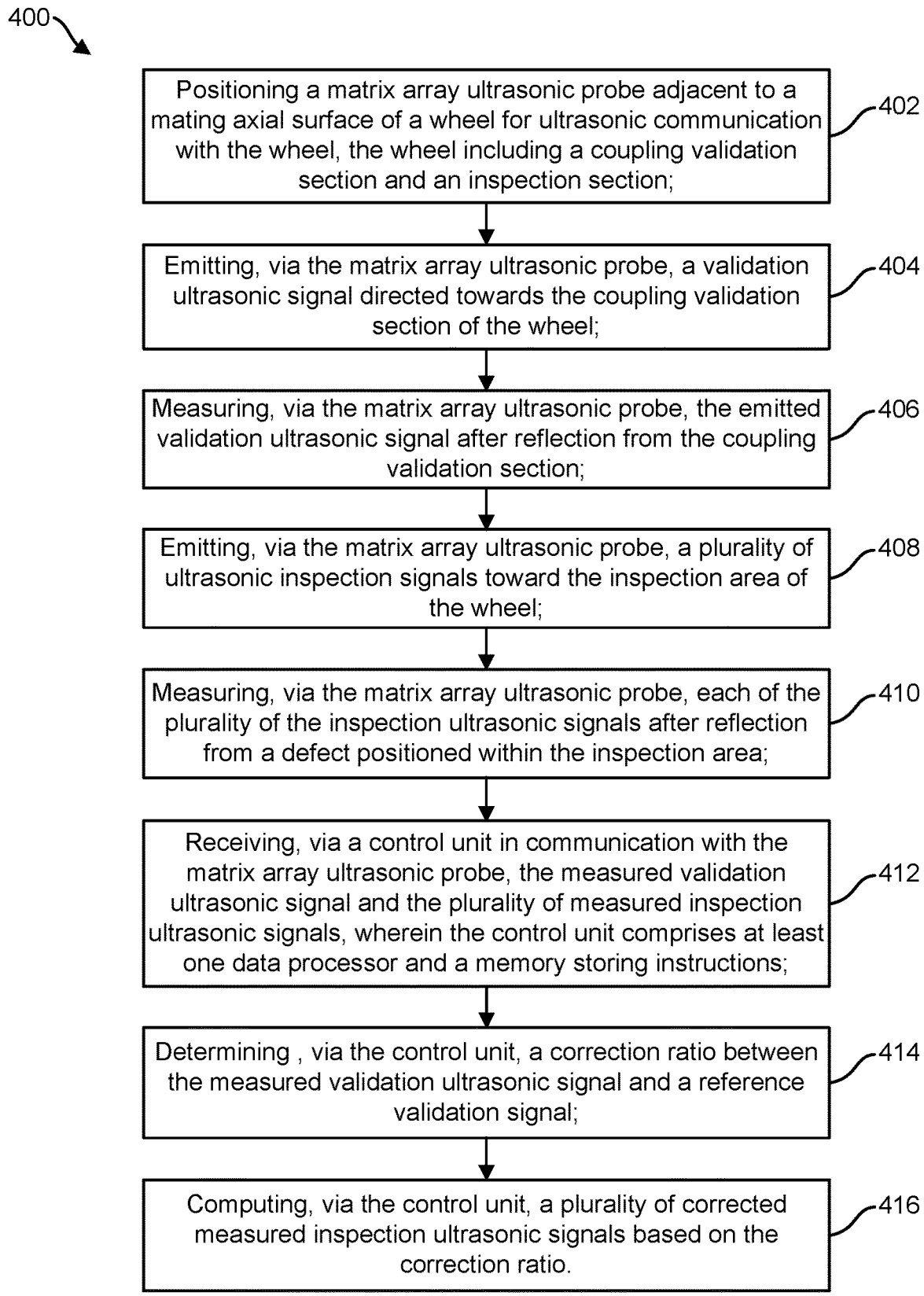
FIG. 5 is an exemplary embodiment of a method of operating the NDT device of FIGS. 3A-4.

Referring now to FIG. 5, a flow diagram illustrating an exemplary embodiment of a method 400 for ultrasonic inspection in which the matrix array ultrasonic probe 102 can be configured to both perform ultrasonic inspection of the train wheel 10 and validate its ultrasonic coupling with the train wheel 10. The method 400 is described below in connection with the ultrasonic NDT device assembly 200 of FIGS. 3A-4. As illustrated, the method 400 includes operations 402-416. However, alternative embodiments of the method can include greater or fewer operations than illustrated in FIG. 5, and the operations can be performed in a different order than illustrated in FIG. 5.

In operation 402, the matrix array ultrasonic probe 102 can be positioned for ultrasonic communication with the train wheel 10. In an exemplary implementation, the matrix array ultrasonic probe 102 can be positioned using the positioning unit 210. As an example, the matrix array ultrasonic probe 102 can be positioned on or adjacent to the inner axial surface 12 of the train wheel 10. In operations 404-406, the matrix array ultrasonic probe 102 can emit the validation ultrasonic signal 113 towards a coupling validation section 32 within the train wheel 10 and measure the corresponding reflected validation ultrasonic signal 113. As illustrated in FIGS. 2A and 2B, the train wheel 10 can include a coupling validation section 32 arranged on the outer axial surface 13 of the body 15. It should be appreciated that multiple coupling validation sections 32 can be arranged on the train wheel 10. Furthermore, the matrix array ultrasonic probe 102 can be configured to sweep the emitted validation ultrasonic signal 113 through an arc of predetermined directions and measure a plurality of validation ultrasonic signals 113 after reflection from a plurality of coupling validation sections.

In operation 408, the matrix array ultrasonic probe 102 can emit a plurality of ultrasonic inspection signals 114 towards the inspection sections 20, 22, and 24 of the train wheel 10. Similar to the validation ultrasonic signals 113, the emitted inspection ultrasonic signals 114 can be swept through an arc of predetermined directions. In operation 410, the matrix array ultrasonic probe 102 can measure the emitted inspection ultrasonic signals 114 after reflection from a defect within the inspection sections 20, 22, and/or 24 (e.g., defects 26, 28, and/or 30). Thus, the matrix array ultrasonic probe 102 that emits inspection ultrasonic signals 114 can be configured to sweep the inspection ultrasonic signals 114 through an arc of predetermined directions, and the matrix array ultrasonic probe 102 that measures the reflected inspection ultrasonic signals 114 can be configured to measure the plurality of inspection ultrasonic signals 114 after reflection from a plurality of respective defects 26, 28, and/or 30.

The manner in which the validation ultrasonic signal 113 and the plurality of inspection ultrasonic signals 114 are generated can be chosen based upon the train wheel 10 under inspection. In general, a predefined number of inspection ultrasonic beams can be generated, followed by a validation ultrasonic signal, or vice versa. In one aspect, the inspection ultrasonic signals and validation ultrasonic signals can be alternatingly generated. In another aspect, a predetermined number of inspection ultrasonic signals can be generated (e.g., approximately 100,) followed by one or more validation ultrasonic signal. This cycle can be repeated or varied as necessary for the duration of ultrasonic testing.

In operations 412-416, the control unit 300 can validate the ultrasonic coupling of the matrix array ultrasonic probe 102 with the train wheel 10. In operation 412, the control unit 300 can receive a measured validation ultrasonic signal 113 and a plurality of measured inspection ultrasonic signals 114 (e.g., from the matrix array ultrasonic probe 102). In operation 414, the control unit can determine that the measured validation ultrasonic signal 113 matches a reference validation ultrasonic signal. The reference validation ultrasonic signal can be maintained by the memory 304 and the processor 302 can conduct a comparison of the two to determine a match or determine a ratio between the values. As an example, a ratio can be identified when the measured validation ultrasonic signal 113 and the reference validation ultrasonic signal differ by greater than a threshold amount (e.g., on the basis of strength as a function of time). Under this circumstance, the control unit can be configured to use the ratio in order to correct the plurality of inspection ultrasonic signals 114 in operation 416.

Exemplary technical effects of the methods, systems, and devices described herein include, by way of non-limiting example, integrated ultrasonic testing and ultrasonic coupling validation, in one aspect, ultrasonic coupling validation can be provided for the matrix array ultrasonic probe. That is, unlike existing ultrasonic testing system, ultrasonic coupling between the matrix ultrasonic probe and a train wheel can be measured directly, rather than assumed based upon measurements from other ultrasonic probes. This direct validation can ensure that ultrasonic testing results are properly interpreted. In another aspect, the use of matrix array ultrasonic probe in an ultrasonic testing system can substantially minimize the risk that defects are missed due to erroneous interpretations of ultrasonic testing results. In a further aspect, improved ultrasonic testing systems can be provided in which all ultrasonic probes are employed for detection of defects. That is in contrast to existing ultrasonic testing systems where some probes (e.g., validation ultrasonic probes) are employed solely for coupling validation and not defect detection. The absence of probes configured for different functions can reduce the complexity and cost of ultrasonic testing.

The present disclosure is not limited to the exemplary embodiments described herein and can be embodied in variations and modifications. The exemplary embodiments are provided merely to allow one of ordinary skill in the art to understand the scope of the present disclosure, which will be defined by the scope of the claims. Accordingly, in some embodiments, well-known operations of a process, well-known structures, and well-known technologies are not be described in detail to avoid obscure understanding of the present disclosure. Throughout the specification, same reference numerals refer to same elements.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly-embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiments. Various modifications and changes can be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. A non-destructive testing system, comprising:
a probe positioning assembly;
a matrix array ultrasonic probe arranged on the probe positioning assembly configured to position the matrix array ultrasonic probe adjacent to a mating axial surface of a wheel for ultrasonic communication with the wheel;
wherein the matrix array ultrasonic probe is configured to:
emit a validation ultrasonic signal directed towards a coupling validation section within the wheel;
measure the emitted validation ultrasonic signal after reflection from the coupling validation section;
emit a plurality of ultrasonic inspection signals directed towards at least one inspection section of the wheel;
measure each of the plurality of ultrasonic inspection signals reflected from a defect positioned within the inspection section of the wheel;
at least one data processor; and
a memory storing instructions, which when executed by at the least one data processor causes the at least one data processor to perform operations comprising:
receiving the measured validation ultrasonic signal and the plurality of measured inspection ultrasonic signals;
determining a correction ratio between the measured validation ultrasonic signal and a reference validation signal; and
computing a plurality of corrected measured inspection ultrasonic signals based on the correction ratio.

2. The non-destructive testing system of claim 1, wherein the inspection section further comprises a first inspection section and a second inspection section.

3. The non-destructive testing system of claim 2, wherein the first inspection section is an outer axial surface of the wheel and the second inspection section is a flange of the wheel.

4. The non-destructive testing system of claim 1, wherein the coupling validation section is an outer axial surface opposite the mating axial surface of the wheel.

5. The non-destructive testing system of claim 4, wherein the validation ultrasonic signal is a back-wall echo of a single ultrasonic inspection signal from the plurality of ultrasonic inspection signals directed at the outer axial surface.

6. The non-destructive testing system of claim 1, further comprising an ultrasonic complaint fluid arranged between the matrix array ultrasonic probe and the mating axial surface of the wheel.

7. The non-destructive testing system of claim 1, wherein the matrix array ultrasonic probe emitting the plurality of inspection ultrasonic signals is configured to sweep the plurality of inspection ultrasonic signals through an arc of predetermined directions.

8. The non-destructive testing system of claim 1, wherein the matrix array ultrasonic probe measuring the plurality of reflected inspection ultrasonic beams is configured to measure a plurality of inspection ultrasonic signals after reflection from a plurality of respective defects.

9. The non-destructive testing system of claim 1, wherein the probe positioning assembly is configured to reversibly lift the wheel above an underlying surface and to rotate the wheel while lifted.

10. A method, comprising:
positioning a matrix array ultrasonic probe adjacent to a mating axial surface of a wheel for ultrasonic communication with the wheel, the wheel including a coupling validation section and an inspection section;
emitting, via the matrix array ultrasonic probe, a validation ultrasonic signal directed towards the coupling validation section of the wheel;
measuring, via the matrix array ultrasonic probe, the emitted validation ultrasonic signal after reflection from the coupling validation section;
emitting, via the matrix array ultrasonic probe, a plurality of ultrasonic inspection signals toward the inspection area of the wheel;
measuring, via the matrix array ultrasonic probe, each of the plurality of the inspection ultrasonic signals after reflection from a defect positioned within the inspection area;
receiving, via a control unit in communication with the matrix array ultrasonic probe, the measured validation ultrasonic signal and the plurality of measured inspection ultrasonic signals, wherein the control unit comprises at least one data processor and a memory storing instructions;
determining via the control unit, a correction ratio between the measured validation ultrasonic signal and a reference validation signal; and
computing, via the control unit, a plurality of corrected measured inspection ultrasonic signals based on the correction ratio.

11. The method of claim 10, wherein the inspection section further comprises a first inspection section and a second inspection section.

12. The method of claim 11, wherein the first inspection section is an outer axial surface of the wheel and the second inspection section is a flange of the wheel.

13. The method of claim 10, wherein the coupling validation section is an outer axial surface opposite the mating axial surface of the wheel.

14. The method of claim 13, wherein the validation ultrasonic signal is a back-wall echo of a single ultrasonic inspection signal from the plurality of ultrasonic inspection signals directed at the outer axial surface.

15. The method of claim 10, further comprising an ultrasonic complaint fluid arranged between the matrix array ultrasonic probe and the mating axial surface of the wheel.

16. The method of claim 10, wherein the matrix array ultrasonic probe emitting the plurality of inspection ultrasonic signals is configured to sweep the plurality of inspection ultrasonic signals through an arc of predetermined directions.

17. The method of claim 10, wherein the matrix array ultrasonic probe measuring the plurality of reflected inspection ultrasonic beams is configured to measure a plurality of inspection ultrasonic signals after reflection from a plurality of respective defects.

18. The method of claim 10, wherein the probe positioning assembly is configured to reversibly lift the wheel above an underlying surface and to rotate the wheel while lifted.

* * * * *